United States Patent [19]

Weber et al.

[11] Patent Number: 4,836,510
[45] Date of Patent: Jun. 6, 1989

[54] METALLURGICAL PLANT

[75] Inventors: Alfred Weber, St. Georgen/Gusen; Johann Aglas, Hofkirchen; Franz Hochgatterer, Perg, all of Austria

[73] Assignee: Voest-Alpine Aktiengesellschaft, Linz, Austria

[21] Appl. No.: 176,859

[22] Filed: Apr. 4, 1988

[30] Foreign Application Priority Data

Apr. 9, 1987 [AT] Austria .................................. 871/87

[51] Int. Cl.$^4$ ................................................ C21C 5/28
[52] U.S. Cl. ...................................... 266/142; 266/158
[58] Field of Search ............... 266/142, 143, 158, 159; 373/8, 9

[56] References Cited

U.S. PATENT DOCUMENTS

| 4,390,168 | 1/1983 | Müller | 266/142 |
| 4,477,910 | 10/1984 | Nijhawan et al. | 373/9 |
| 4,638,487 | 1/1987 | Tomizawa | 266/158 |

OTHER PUBLICATIONS

K. Grubert; H.-U. Haering; D. Marchand and S. Muth, "Einsatz enger Elektroofen-Einhausungen zur Abgaserfassung und Lärmminderung; Betriebserfahrungen an zwei 50-t-Lichtbogen-und zwei 15-t-Induktionsöfen", *Stahl und Eisen* 10412/(1984) No. 5, pp. 235 to 239.

*Primary Examiner*—S. Kastler
*Attorney, Agent, or Firm*—Kurt Kelman

[57] ABSTRACT

In order to ensure that flue gases will not escape from an enclosure (1) which contains a metallurgical vessel (2) as charging boxes (10) are moved into and out of the enclosure, the charging crane (14) is disposed inside the enclosure (1) and the enclosure contains at least one lock chamber (11), which is adapted to contain a charging box (10) in a stand-by position and which adjoins a charging opening (9) that is formed in a side wall (5) of the enclosure. A top wall of the lock chamber is formed with an opening (12), which is adapted to be closed and through which a charging box can be moved between the lock chamber and the main part of the interior of the enclosure.

3 Claims, 3 Drawing Sheets

METALLURGICAL PLANT

BACKGROUND OF THE INVENTION

1. Field of the Invention

This invention relates to a metallurgical plant comprising an enclosure and in said enclosure a metallurgical vessel, wherein said enclosure comprises a side wall formed with at least one charging opening, which is adapted to be closed and permits a charging box to move through said opening, and a charging crane for moving the charging box in the enclosure between a stand-by position and a charging position over the metallurgical vessel, which is provided with a cover that is adapted to be opened.

2. Description of the Prior Art

It is known (Grubert, K.; Haering, H.U.; Marchand, D.; Muth, S.: Einsatz enger Elektroofen-Einhausungen zur Abgaserfassung und Lärmminderung, Stahl and Eisen 104 (1984), No. 5, pages 235 to 239) that the adverse effect of flue gases and noise on the environment during the charging of a metallurgical vessel, such as an electric furnace, can be limited by an enclosure the electric furnace, which provides between the furnace and a side wall formed with a charging opening a space which is adapted to receive a charging box. By means of a charging crane disposed outside the enclosure, the charging box can be moved through the charging opening in said side wall to a waiting position. The enclosure can then substantially be closed and thereafter the cover of the furnace can be lifted and can be horizontally pivotally moved away from the furnace vessel so that the latter can be charged from the charging box. In such plants the flue gases escaping from the furnace vessel can be sucked inside the enclosure and the charging opening in the side wall of the enclosure needs to be opened only when the furnace is closed by its cover. A metallurgical plant comprising such an enclosure has the disadvantage that the ropes of the charging crane, which ropes are connected to the suspension tackle for the charging box, require the enclosure to be formed in its top wall with a top opening, which extends from the charging opening in a side wall of the enclosure at least as far as to the center of the vessel, so that flue gases rising from the opened furnace vessel can escape through said top opening into the casting house. Besides, when the charging opening is open, the interior of the enclosure is in direct communication with the casting house so that it is not possible to move a full charging box into the enclosure and to remove an emptied charging box out of the enclosure as the furnace is charged.

SUMMARY OF THE INVENTION

It is an object of the invention to avoid the disadvantages outlined hereinbefore and so to improve a metallurgical plant of the kind described first hereinbefore that the charging of the metallurgical vessel will not adversely affect the environment by flue gases, dust, noise or heat.

It is another object of the invention to provide such a plant in which a charging box can be moved into and out of the enclosure as the metallurgical vessel is charged.

These objects are accomplished in accordance with the invention with a charging crane disposed inside the enclosure and an enclosure comprising partition means defining at least one lock chamber for containing the charging box in its stand-by position, which lock chamber adjoins the charging opening in the side wall of the enclosure and an opening that is formed in a top wall defining the lock chamber and is adapted to be closed and constitutes a passage for the charging box.

Because the charging crane is disposed inside the enclosure for the metallurgical vessel, it is no longer necessary to form the top wall of the enclosure with openings through which the ropes of the crane extend. As a result, the enclosure can sufficiently be sealed so that an adverse effect on the environment by flue gases, dust, noise or heat will be avoided. Whereas the use of a charging crane disposed inside the enclosure necessitates the use of a transfer truck or other transfer means for moving the charging box into and out of the enclosure, the fact that the charging crane is not required for the transfer of the charging box into and out of the enclosure affords the advantage that a full charging box can be moved into the enclosure or an empty charging box can be moved out of the enclosure while the charging crane is used to charge the metallurgical vessel. That mode of operation will not involve a risk of an additional adverse effect on the environment because the enclosure contains at least one lock chamber for containing the charging box in its stand-by position. That lock chamber adjoins the charging opening formed in a side wall of the enclosure. When the charging opening is closed, the charging box contained in the lock chamber can be moved by the charging crane through the opened opening in the top wall of the lock chamber into the main part of the interior of the enclosure, which main part contains the metallurgical vessel. When the opening in the top wall of the lock chamber has been closed, the charging opening can be opened for a free access to the lock chamber whereas the sealing of the main part of the interior of the enclosure will not be affected. In order to ensure that the enclosure will be sound- and heat-insulated even when the charging opening is open, the lock chamber may be provided with sound and heat insulation like the remaining portions of the enclosure.

During a charging of the metallurgical vessel or during a pretreatment of the charge material inside the enclosure it is desired to move a full charging box into a lock chamber and to move a charging box which has been emptied into the vessel out of the enclosure. To that end the lock chamber may be designed to accommodate two charging boxes. In a particularly desirable arrangement, two lock chambers are provided and adjoin respective charging openings and respective chamber top wall openings, which are adapted to be opened and closed in alternation and in succession in mutually opposite senses. In that case one of the lock chambers will always be open toward the main part of the interior of the enclosure and will be sealed from the environment of the enclosure and the other lock chamber will be sealed from the main part of the interior of the enclosures whereas the associated charging opening will be open. When a charging box is contained in each of the two lock chambers and the shutters associated with the chamber top wall openings and with the charging openings in the side wall of the enclosure are operated in succession in mutually opposite senses, a charging box which has been introduced into a lock chamber from the outside can be picked up by the charging crane and the empty charging box which has been deposited in the other lock chamber by the charging crane can be moved out of that lock chamber and out of the enclosure. That method of moving charging boxes into and out of the enclosure will afford special advantages if it is desired to use flue gases escaping from the metallurgical vessel for a drying and preheating of the charge material before the latter is charged into the vessel. In that case the charging boxes will have to be delivered by the charging crane to the predrying and preheating station and flue gases may escape into the interior of the enclosure as the charging boxes are moved to and from said station.

A closing and opening of the chamber top wall openings and the charging openings in the side wall of the enclosure in succession and in mutually opposite senses can be effected in a simple manner if the lock chambers are arranged one beside the other and closely spaced apart in the direction in which the shutters for the charging openings and for the chamber top wall openings are operated and common shutters are associated with the two charging openings and with the two chamber top wall openings, respectively. As each of said common shutters can close only one of the two openings which are to be opened and closed in alternation, the associated other opening will necessarily be open. A common shutter cannot be associated with two corresponding openings unless the two lock chambers are arranged one beside the other in the direction in which the shutters are operated. This means that the use of sliding shutters will require the lock chambers to be arranged one beside the other in the direction of the sliding movement of the shutters whereas the use of pivoted shutters will require the pivotal axis of each shutter to be disposed between the two lock chambers if the desired result is to be achieved.

DETAILED DESCRIPTION OF THE PREFERRED EMBODIMENT

Figure 1:
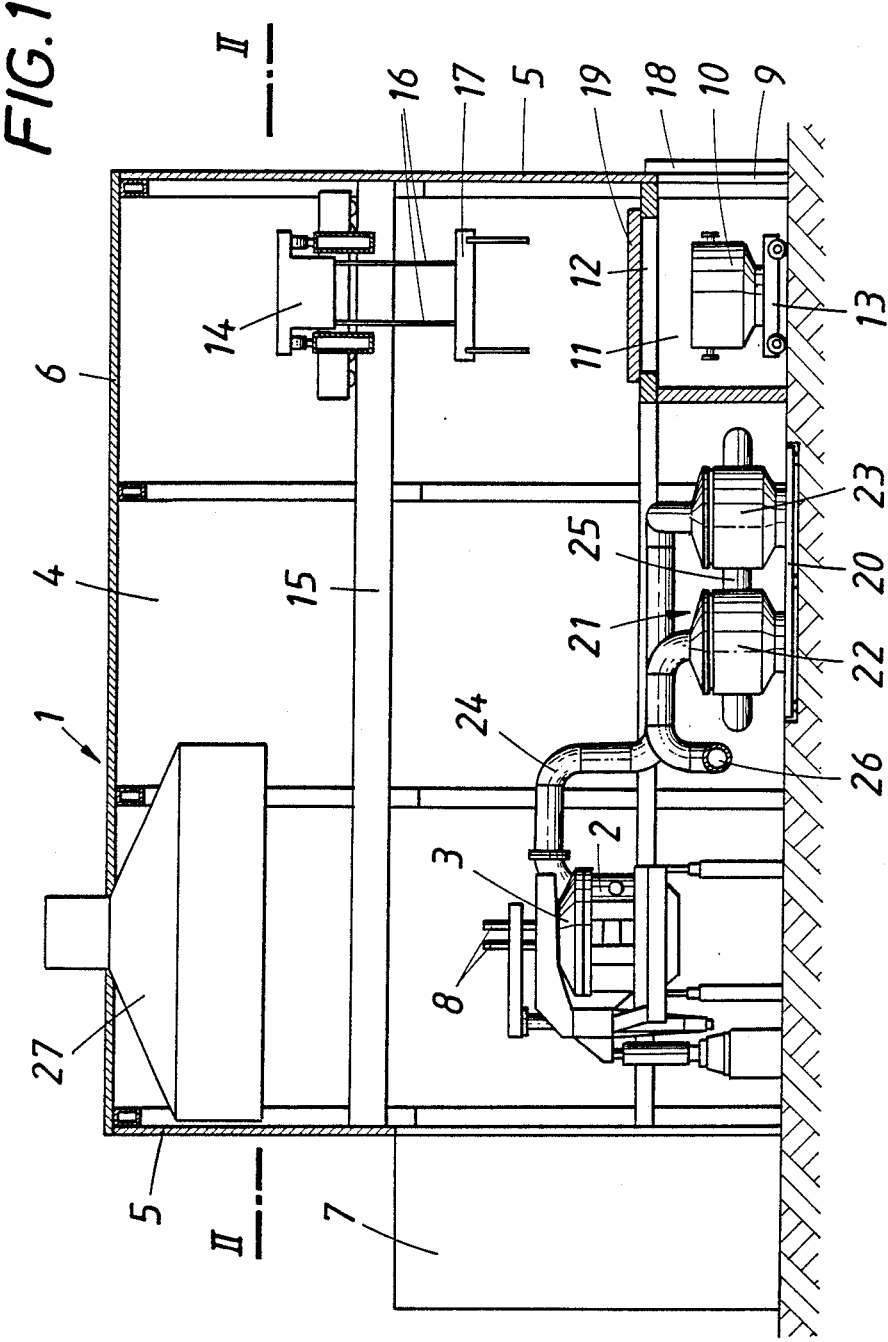
FIG. 1 is a diagrammatic longitudinal sectional view showing a metallurgical vessel in an enclosure of a metallurgical plant embodying the invention.
Figure 2:
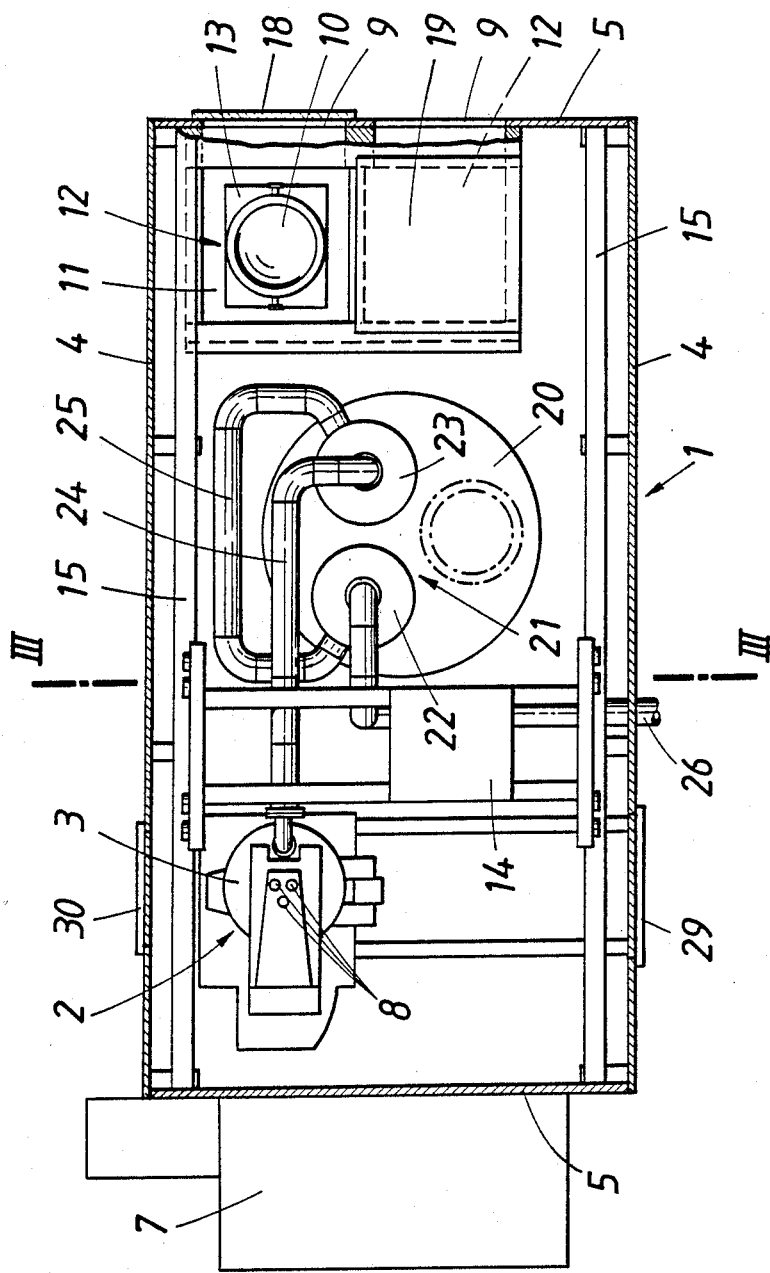
FIG. 2 is a sectional view taken on line II—II in FIG. 1 with the charging crane in a different position.
Figure 3:
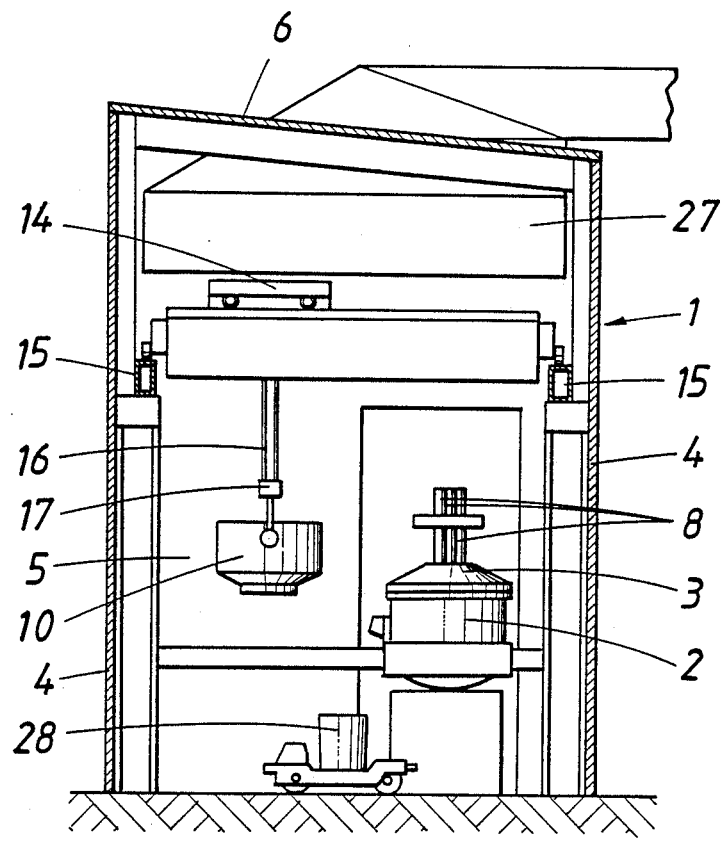
FIG. 3 is a sectional view taken on line III—III in FIG. 2.

An embodiment of the invention will now be described more in detail with reference to the drawing.

An enclosure 1 contains a metallurgical vessel 2, which consists of an open-topped electric furnace that is provided at its top with a cover 3, which can be lifted from the vessel 2 and pivotally moved away from the same. The enclosure 1 comprises two broadside walls 4, two narrow side walls 5 and a top wall 6. A transformer 7 to which the electrodes 8 of the electric furnace are connected is mounted on that narrow side wall 5 which is nearer to the metallurgical vessel 2. The opposite narrow side wall 5 is formed with two charging openings 9, through which charging boxes 10 can be moved into and out of the enclosure 1. Whereas in known enclosures a charging opening directly adjoins the interior of the enclosure, in the present enclosure the charging openings 9 open into respective lock chambers 11, each of which is defined by a chamber top wall formed with a chamber top wall opening 12, through which a charging box 10 can be moved. By means of transfer trucks 13, the charging boxes 10 are moved through the charging openings 9 into the lock chambers 11. A charging crane 14 can be operated to lift the charging boxes 10 out of the lock chambers 11 through the openings 12 in the top walls of the chambers. The charging crane 14 and the associated track 15 are disposed inside the main part of the interior of the enclosure 1, i.e., in that part which contains the vessel 2. As a result, the crane ropes 16 connected to the suspension tackle 17 for suspending the charging boxes 10 need not extend through the top wall 6 of the enclosure 1 so that a substantially gastight seal of the enclosure 1 can be effected.

A common sliding shutter 18 is associated with both charging openings 9 so that one of the two charging openings 9 will always be closed by that sliding shutter 18 when the other charging opening is entirely open. Similarly, the two openings 12 formed in the top walls of the two lock chambers 11 can be opened and closed in alternation by a common sliding shutter 19 in a sense which is opposite to the opening and closing of the associated charging openings 9. That simple measure will ensure that any one of the two lock chambers 11 may be open toward the main part of the interior of the enclosure whereas the associated charging opening 9 will be closed and the other lock chamber will be sealed from said main part of the interior of the enclosure and will be accessible from the outside of the enclosure 1. A full charging box 10 can be moved into said one lock chamber 11 through the open charging opening 9 or an empty charging box can be moved out of said lock chamber through said charging opening and a full charging box can be moved out of the other lock chamber 11 into the main part of the interior of the enclosure 1 or an empty charging basket can be deposited in said lock chamber 11 through the associated opening in the top wall of the chamber by means of the charging crane 14 at the same time.

When a full charging box has been moved into a given lock chamber 11 through the open charging opening 9 and that charging opening 9 has been closed by the sliding shutter 18 and the sliding shutter 19 for the opening 12 in the top wall of said chamber has subsequently been opened, the charging crane 14 is operated to lift that charging box out of the lock chamber through the associated top wall opening and to deposit said charging box on a rotary disc 20, which is rotated to move the deposited charging box 10 to a pretreating station 21, in which the charge material can be dried and preheated. In that station 21 the charge material contained in the charging box is treated in two stages 22 and 23 with flue gases escaping from the metallurgical vessel 2. For this purpose the hot flue gases are delivered in a supply duct 24 to the drying stage 23 and are transferred from that drying stage 23 in a transfer duct 25 to the preheating stage 22. The flue gases which have been exhausted from the stage 22 are withdrawn from the enclosure in the exhaust duct 26.

When the charge material usually consisting of scrap has been preheated, the charging crane 14 is operated to remove the charging box from the station 21 and to empty the charging box into the electric furnace when the cover 3 thereof has been opened. Any flue gases which escape from the electric furnace at that time will be sucked through a suction hood 27 out of the enclosure 1. One broadside wall 4 of the enclosure 1 is formed with an opening 29, which is adapted to be closed and through which the steel ladle 28 can be moved out of the enclosure. The slag ladle can be moved out of the enclosure 1 through an opening 30, which is formed in the opposite broadside wall 4 of the enclosure 1.

It is apparent that the charging boxes 10 can freely be moved into and out of the enclosure 1 even during an escape of flue gas into the interior of the enclosure and the enclosure can sufficiently be sealed during that time so that an adverse effect on the environment by flue gases, noise or heat can be avoided. Fluxes and alloying materials can be charged into the metallurgical vessel 2 through suitable ducts from the outside of the enclosure 1 so that an access into the enclosure will not be required during the usual operation of the furnace.

We claim:

1. A metallurgical plant comprising
    an open-topped metallurgical vessel provided with a cover adapted to close said vessel at its top,
    an enclosure surrounding said vessel and comprising a top wall and side wall means defining at least one charging opening permitting a charging box to be moved through said side wall means from the outside of said enclosure to a stand-by position in said enclosure,
    first shutter means for selectively opening and closing said charging opening, and
    a charging crane for moving said charging box between said stand-by position and a charging position over said vessel,
    wherein the improvement comprises
    partition means contained in said enclosure and dividing the interior thereof into a main part containing said vessel and lock chamber means adjoining said charging opening and adapted to contain said charging box in said stand-by position,
    said partition means comprises lock chamber top wall means spaced from said top wall of the enclosure and defines lock chamber top wall opening means, through which said lock chamber means communicates with said main part of said interior and which permits said charging box to be moved between said lock chamber means and said main part of said interior,
    second shutter means for selectively opening and closing said lock chamber top wall opening means, and
    said charging crane is disposed within said main part of said interior and is operable to move said charging box through said lock chamber top wall opening means between said stand-by and charging positions.

2. The improvement set forth in claim 1, wherein
    said side wall means defines with two of said charging openings,
    said partition means define two lock chambers, each of which adjoins one of said charging openings and is adapted to contain one of said charging boxes in a stand-by position,
    said chamber top wall means defines with two chamber top wall openings,
    each of said lock chambers communicates through one of said chamber top wall openings with said main part of said interior,
    said charging crane is operable to move a charging box between each of said lock chambers and said main part of said interior through said chamber top wall openings, and
    said first and second shutter means are operable to open and close said two charging openings and said two chamber top wall openings in alternation and in succession in mutually opposite senses.

3. The improvement set forth in claim 2, wherein
    said first and second shutter means are movable generally in a predetermined direction to open and close said charging openings and said chamber top wall openings, respectively,
    said two lock chambers are arranged one beside the other and closely spaced apart in said predetermined direction,
    said first shutter means comprise a first shutter for opening and closing said two charging openings in alternation and
    said second shutter means comprise a second shutter for opening and closing said two chamber top wall openings in alternation.

* * * * *